United States Patent [19]
Fu et al.

[11] Patent Number: 5,580,833
[45] Date of Patent: Dec. 3, 1996

[54] HIGH PERFORMANCE CERAMIC COMPOSITES CONTAINING TUNGSTEN CARBIDE REINFORCED CHROMIUM CARBIDE MATRIX

[75] Inventors: Cheng-Tsu Fu; Ai-Kang Li, both of Hsinchu; Chung-Ping Lai, Taipei; Jia-Ruey Duann, Hsinchu, all of Taiwan

[73] Assignee: Industrial Technology Research Institute, Hsinchu Hsien, Taiwan

[21] Appl. No.: 289,599

[22] Filed: Oct. 11, 1994

[51] Int. Cl.$^6$ ................................................. C04B 35/56
[52] U.S. Cl. .................................. 501/87; 501/93; 75/240
[58] Field of Search ............................ 75/240, 241, 248; 501/87, 93

[56] References Cited

U.S. PATENT DOCUMENTS

| | | | |
|---|---|---|---|
| 3,552,937 | 1/1971 | Mito et al. | 75/240 |
| 4,927,791 | 5/1990 | Isozaki et al. | 501/87 |
| 4,945,073 | 7/1990 | Dubensky et al. | 501/93 |
| 4,963,183 | 10/1990 | Hong | 75/241 |
| 5,141,571 | 8/1992 | DuBois | 148/427 |

FOREIGN PATENT DOCUMENTS

| | | |
|---|---|---|
| 53-89807 | 8/1978 | Japan . |
| 59-107972 | 6/1984 | Japan . |
| 60-145954 | 8/1985 | Japan . |
| 62-211340 | 9/1987 | Japan . |

OTHER PUBLICATIONS

Japanese Patent Abstract–"Sliding Member and its Product and Thermal Spraying Material Used Therefor" Kuman et al. JP 04–147956 (1992).
Japanese Patent Abstract–"Mold for Optical Element" Shibazaki et al. JP 01–286964 (1990).

*Primary Examiner*—Paul Marcantoni
*Attorney, Agent, or Firm*—W. Wayne Liauh

[57] ABSTRACT

A high performance ceramic composite containing tungsten carbide reinforced chromium carbide matrix in which 5~35 vol % of tungsten carbide particles are uniformly dispersed in 65~95 vol % of chromium carbide matrix. The diameters of the tungsten carbide and chromium carbide particles are preferably in the rage between 0.1~10 μm, and their average diameters are preferably at about 2.0 and 1.5 μm, respectively. The tungsten carbide/chromium carbide composite is prepared from a sintering process by applying heat and pressure to a green compact containing tungsten carbide and chromium carbide particles, without using a metallic sintering aid. As a result, the tungsten carbide reinforced chromium carbide composite retains all the advantageous characteristics of the chromium carbide material, such as excellent strength, hardness, anti-oxidation, anti-scaling, anti-erosion and anti-corrosion properties as well as excellent permanent non-magnetizability and surface lustrousness, while providing improved flexural strength and fracture toughness. The tungsten carbide reinforced chromium carbide composite is most suitable for industrial applications where reliability is critical.

12 Claims, 3 Drawing Sheets

HIGH PERFORMANCE CERAMIC COMPOSITES CONTAINING TUNGSTEN CARBIDE REINFORCED CHROMIUM CARBIDE MATRIX

FIELD OF THE INVENTION

The present invention relates to a sintered ceramic composite containing tungsten carbide (WC) reinforced chromium carbide ($Cr_3C_2$) matrix. More specifically, the present invention relates to a high performance ceramic composite, which is a tungsten carbide reinforced chromium carbide composite containing from about 5 to about 35 percent by volume of tungsten carbide in a chromium carbide matrix, from about 65 to about 95 percent by volume, and is formed via a sintering process without a metallic sintering aid. The tungsten carbide reinforced chromium carbide composite disclosed in the present invention provides many desired mechanical characteristics, including improved flexural strength and improved fracture toughness, and is thus an excellent ceramic composite material for use in many industrial applications where reliability is critical.

BACKGROUND OF THE INVENTION

Chromium carbide type ceramic materials have been known to have many excellent characteristics, including excellent strength, hardness, anti-oxidation, anti-scaling, anti-erosion and anti-corrosion properties, they also exhibit excellent permanent non-magnetizability and surface lustrousness. As a result, chromium carbide type ceramic materials have been widely used in a variety of industrial applications, such as shaft bearings, shaft seals, high-temperature furnaces, nozzles, metal machining molds, measurement tools, etc. Typically, there are four species of the chromium carbide, namely $Cr_3C_2$, $Cr_7C_3$, $Cr_{23}C_6$, and $Cr_3C$, of which $Cr_3C_2$ is the most commonly employed. However, it has also been reported that chromium carbide ceramic material does not provide satisfactory property in fracture toughness, and, as a consequence, the reliability of the chromium carbide material is less than desired. This weakness severely limits the applicability of the chromium carbide ceramic material in harsh environment.

U.S. Pat. Nos. 4,927,791, 4,945,073, 4,963,183, and 5,141,571, and Japanese Laid-open Patent Application Nos. 53-89807, 59-107972, 60-145954, and 62-211340 disclose a variety of chromium carbide based composite materials. These composite materials contain at least two of the following starting materials: (A) 0.2–10 wt % of at least one nitride, such as CrN, TiN, TaN, NbN, ZrN, AlN, VN, $Si_3N_4$ and BN; (B) 5–45 wt % of various species of chromium carbide other than $Cr_3C_2$, i.e., $Cr_7C_3$, $Cr_{23}C_6$, and $Cr_3C$; (C) 0.5–50 wt % of aluminum nitride, AlN; (D) 45–90 wt % of tungsten carbide; (E) 10–40 wt % of more than one kind of carbide or nitride of a transitional metal, such as Ti, V, Cr, Zr, Nb, Mo, Ta, Hf, etc.; (F) 1–30 wt % of a metallic sintering aid (such as Ni, Cr, Co, Ti, etc.); and (G) stoichiometric balance of chromium carbide $Cr_3C_2$. Although these composites exhibit improved mechanical properties than the single-component chromium carbide ceramic material, shortcomings still exist.

Japanese Laid-open Patent Application Nos. 59-107972 discloses a sintered chromium carbide body containing 0.2 to 10% by weight of AlN. Because the amount of AlN in the chromium carbide composite disclosed in the '792 patent is less than 10%, it only provides limited improvement in the flexural strength of the final produce, to between about 310 and 540 MPa.

U.S. Pat. No. 4,927,791 discloses a sintered chromium carbide body containing 99.5% to 50% by weight of chromium carbide and 0.5 to 50% by weight of AlN. The chromium carbide crystals in these composites have an acicular (needle-shaped) structure. Although the chromium carbide composites disclosed in the '791 patent provide significantly improved fracture toughness (6.2 MPa•$m^{0.5}$ vs 5.5 MPa•$m^{0.5}$ for the conventional relatively equal-axis chromium carbide crystals), its flexural strength, which is about 400 MPa, is still considered less than desired.

Japanese Laid-open Patent Application Nos. 60-145954 discloses a chromium carbide composite containing a mixture of various species of chromium carbide including $Cr_3C_2$, $Cr_7C_3$, $Cr_{23}C_6$, and $Cr_3C$, with $Cr_3C_2$ being the predominant component. In the composite disclosed in the '954 publication, the "other" species, i.e., $Cr_7C_3$, $Cr_{23}C_6$, and $Cr_3C$, are used primarily as sintering aids, they do not contribute to the improvement of the mechanical strength of the final composite material. Therefore, no observable improvement in the flexural strength or fracture toughness is manifested in the composite.

Composites containing tungsten carbide and chromium carbide have been disclosed in the art. However, in these composites, tungsten carbide is the principle component and at least one metallic sintering aid is required in the preparation of the composite. Japanese Laid-open Patent Publication Nos. 62-211340 discloses a tungsten carbide/chromium carbide composite containing 31–84 wt % of tungsten carbide (however, the specifications only discloses examples containing 50–57 wt % of tungsten carbide), 15–60 wt % of TaC, NbC, ZrC, TiC, $Cr_3C_2$, or MoC, and 1–9 wt % of Co or Ni. Japanese Laid-open Patent Publication Nos. 53-89807 discloses a tungsten carbide/chromium carbide composite containing 80+ wt % of tungsten carbide, less than 10 wt % of $Cr_3C_2$, and 10 wt % of Co and no greater than 2 wt % of Cr and/or Ni.

Both composites disclosed in the '340 and '807 publications require metallic sintering agents, which cause the hardness of the sintered products to be reduced. Although the tungsten carbide/chromium carbide composite disclosed in the '340 publication contains mixtures of carbide and/or nitride compounds which allow the amount of metallic sintering aid required to be lowered, it still requires 1–9 percent of Co or Ni. Furthermore, homogeneity of the sintered composites has been a concern with the tungsten carbide/chromium carbide composite disclosed in the '340 publication. Another drawback experienced with the tungsten carbide based composites is that, in high-temperature applications, the metallic components are likely to soften, partially melt or even become partially oxidized. This could seriously and adversely affect the mechanical characteristic as well as the corrosion resistance of the final composite products, and thus undesirably limit the application of these composite materials.

SUMMARY OF THE INVENTION

The primary object of the present invention is to provide a chromium carbide based ceramic composite that provides improved flexural strength and fracture toughness while retaining all the desirable properties of chromium carbide materials, such as good strength, hardness, and good resistance to oxidation, scaling and corrosion, as well as their permanent non-magnetizability and surface lustrousness.

More specifically, the primary object of the present invention is to develop a high performance ceramic composite containing tungsten carbide reinforced chromium carbide matrix that is made from a sintering process without requiring the use of a metallic sintering aid. The metallic sintering aid is likely to cause the product to soften, partially melt or even become partially oxidized during high-temperature applications. The tungsten carbide reinforced chromium carbide matrix, hereinafter tungsten carbide/chromium carbide composite, of the present invention retains all the desired chemical and mechanical properties of the chromium carbide material, while providing improved flexural strength and fracture toughness. These advantages allow the tungsten carbide/chromium carbide composite disclosed in the present invention to provide improved reliability for mechanical parts that are expected to be used in harsh, high-temperature and highly corrosive environment and minimize the occurrence of catastrophic events due to material failure.

The tungsten carbide/chromium carbide composite disclosed in the present invention contains 5~35 vol % of tungsten carbide uniformly dispersed in 65~95 vol % of chromium carbide matrix. The chromium carbide component exists as a continuous phase; whereas, the tungsten carbide component exists primarily as a discrete or discontinuous phase. Preferably, the particle sizes of the tungsten carbide and chromium carbide particles are in the rage between 0.2~10 μm. The diameters of the chromium carbide particles can be in the rage between 0.2~10 μm. And it is preferred that the tungsten carbide and chromium carbide particles have average particle diameters of 2.0 and 1.5 μm, respectively. Since chromium carbide is the continuous phase, the tungsten carbide/chromium carbide composite can be prepared using a sintering process without metallic sintering aids. This contrasts the prior art tungsten carbide based composites, which require a metallic sintering aid.

Because the elastic modulus of pure tungsten carbide, which is about 710 GPa, is substantially higher than that of chromium carbide, which is about 385 GPa, the tungsten carbide/chromium carbide composite of the present invention exhibits better hardness than the pure chromium carbide. Furthermore, because the thermal expansion coefficient of tungsten carbide ($\alpha=6.9\times10^{-6}/°C$.) is smaller than that of chromium carbide ($\alpha=11.2\times10^{-6}/°C$.), a residual stress will remain at the interface between these two components during the post-sintering annealing stage. Such a residual stress causes the preference of the mode of crystalline fracture to be changed from the predominately intercrystalline fracture mode, which is observed in the monolithic chromium carbide, to the predominantly transcrystalline, or intracrystalline, fracture mode observed in the tungsten carbide/chromium carbide composite of the present invention. Such a switch in the fracture mode results in a significant increase in the fracture strength and toughness of the composite material.

Furthermore, results from laboratory tests conducted by the co-inventors show that tungsten carbide particles are also observed to cause a crack-bridging effect when a microcrack is induced in the tungsten carbide/chromium carbide composite of the present invention. The crack-bridging effect, which is observed when the tungsten carbide is the discontinuous phase contributes, at least in part, to the improved fracture toughness of the tungsten carbide/chromium carbide composite of the present invention.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
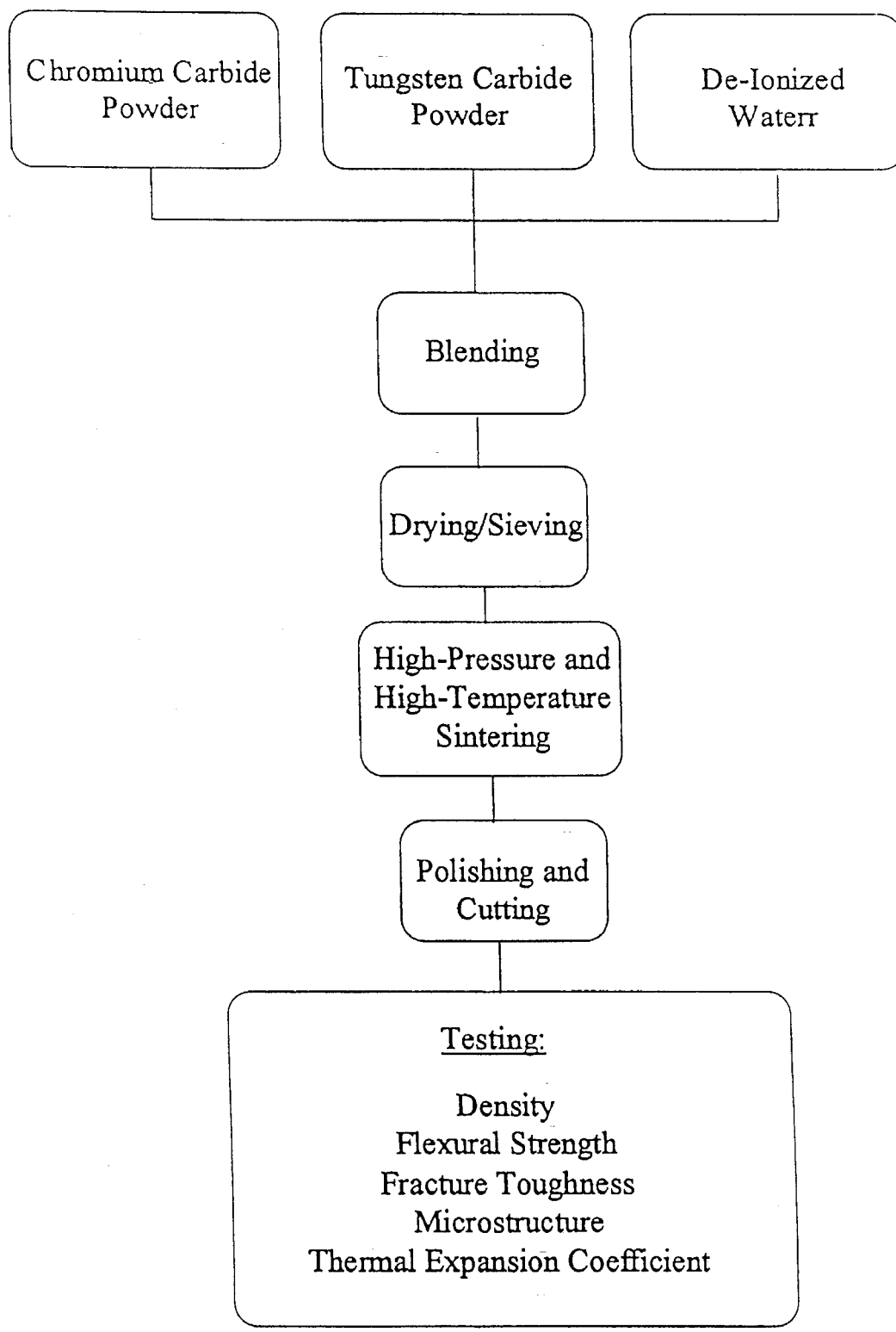
FIG. 1 is a flowchart diagram illustrating the steps of preparing the tungsten carbide/chromium carbide composite of the present invention.
Figure 2A:
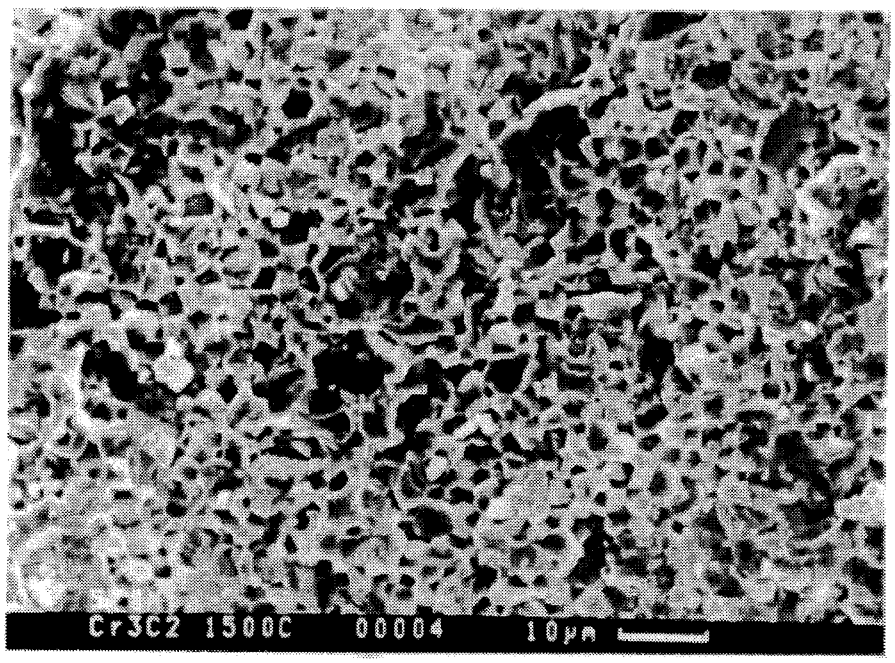
FIG. 2(A) is an SEM photograph showing the intercrystalline fracture mode observed from a fractured surface of a monolithic chromium carbide.
Figure 2B:
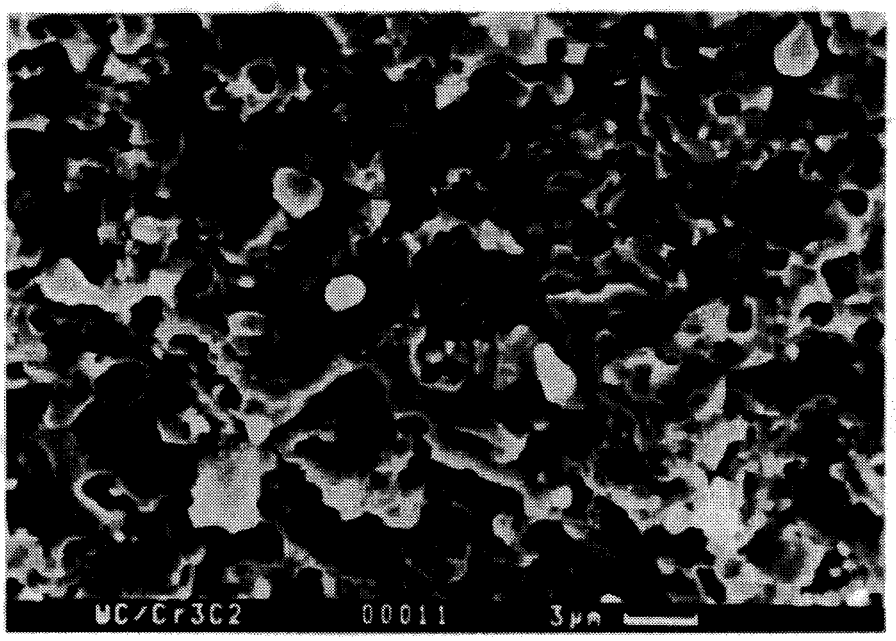
FIG. 2(B) is an SEM photograph showing the transcrystalline fracture mode observed from a fractured surface of a tungsten carbide/chromium carbide composite of the present invention.
Figure 3:
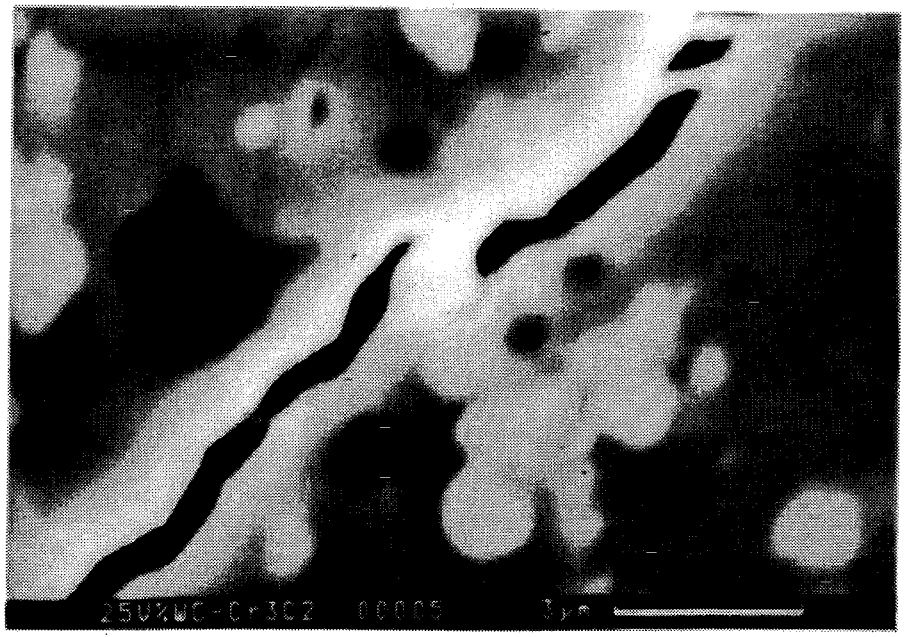
FIG. 3 is an SEM photograph of a fractured tungsten carbide/chromium carbide composite of the present invention showing the crack-bridging effect produced by the tungsten carbide particles (shown as white particles); a microcrack was induced into a polished surface of the tungsten carbide/chromium carbide composite using a Vicker's Indentor.

Now referring to the drawings. FIG. 1 is a flowchart diagram illustrating the various steps of preparing the tungsten carbide/chromium carbide composite disclosed in the present invention. Between 5 and 35 volume percent of tungsten carbide powder and the balance of chromium carbide were added to de-ionized water. The mixture was blended for 24 hours to obtain a homogeneous slurry. After drying, sieving and preforming, the resultant green compact was placed inside a graphite mold, in which it was sintered at 1,400°~1,700° C. under pressure and heat for 1~4 hours. The pressure was maintained at about 30 MPa, and a reducing (argon or nitrogen) sintering environment or vacuum was maintained during the sintering process. After sintering, the sintered products were cut, using a 600-mesh diamond wheel, into 3×4×36 mm specimens, which were then tested for their 4-point flexural strength. In another set of tests, a precrack of about 1 mm deep was formed on the tensile-stressed surface of a test specimen using a 0.15 mm thick diamond blade. A single-edge-notched-beam method was then used to evaluate the fracture toughness of the specimens. Each of these tests involved six identically prepared specimens, and their average test results are reported.

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

EXAMPLE 1

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,400° C. under a pressure of 30 MPa and an argon atmosphere for 2 hours. After sintering, the sintered product was cut into 3×4×36 mm test specimens using a 600-mesh diamond wheel. Relative density (relative to the theoretical density of a single component chromium carbide), hardness, flexural strength and fracture toughness were measured of the test specimens which are 95.6%, 18.17 GPa, 804 MPa, and 5.2 MPa·m$^{0.5}$, respectively. The test results are also summarized in Table 1.

EXAMPLE 2

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,400° C. under a pressure of 30 MPa and an argon atmosphere for 4 hours. The sintered product so obtained was cut into 3×4×36 mm specimens. The measured relative density, hardness, flexural strength and fracture toughness, which are also summarized in Table 1, are 96.5%, 19.78 GPa, 825 MPa, and 5.5 MPa·m$^{0.5}$, respectively.

EXAMPLE 3

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,500° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 98.2%, 20.46 GPa, 816 MPa, and 6.1 MPa·m$^{0.5}$, respectively.

EXAMPLE 4

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,500° C. under a pressure of 30 MPa and an argon atmosphere for 2 hours. The sintered product was cut into 3×4×36 mm specimens. The measured relative density, hardness, flexural strength and fracture toughness, which are also summarized in Table 1, are 98.6%, 20.96 GPa, 846 MPa, and 6.4 MPa·m$^{0.5}$, respectively.

EXAMPLE 5

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,550° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 97.9%, 20.74 GPa, 823 MPa, and 6.3 MPa·m$^{0.5}$, respectively.

EXAMPLE 6

14 vol % of tungsten carbide powder and 86 vol % of chromium carbide were added to de-ionized water and blended for 24 hours to obtain a homogeneous slurry. After drying, sieving and preforming, the resultant green compact was placed in a graphite mold and was sintered at 1,600° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 99.2%, 21.07 GPa, 737 MPa, and 6.0 MPa·m$^{0.5}$, respectively.

EXAMPLE 7

20 vol % of tungsten carbide powder and 80 vol % of chromium carbide were added to de-ionized water and blended for 24 hours to obtain a homogeneous slurry. After drying, sieving and preforming, the resultant green compact was placed in a graphite mold and was sintered at 1,500° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 98.3%, 19.81 GPa, 796 MPa, and 6.5 MPa·m$^{0.5}$, respectively.

EXAMPLE 8

20 vol % of tungsten carbide powder and 80 vol % of chromium carbide were added to de-ionized water and blended for 24 hours to obtain a homogeneous slurry. After drying, sieving and preforming, the resultant green compact was placed in a graphite mold and was sintered at 1,550° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 98.9%, 21.70 GPa, 868 MPa, and 6.7 MPa·m$^{0.5}$, respectively.

EXAMPLE 9

20 vol % of tungsten carbide powder and 80 vol % of chromium carbide were added to de-ionized water and blended for 24 hours to obtain a homogeneous slurry. After drying, sieving and preforming, the resultant green compact was placed in a graphite mold and was sintered at 1,600° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 99.1%, 21.86 GPa, 883 MPa, and 6.8 MPa·m$^{0.5}$, respectively.

EXAMPLE 10

25 vol % of tungsten carbide powder and 75 vol % of chromium carbide were added to de-ionized water and blended for 24 hours to obtain a homogeneous slurry. After drying, sieving and preforming, the resultant green compact was placed in a graphite mold and was sintered at 1,500° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 94.7%, 17.65 GPa, 641 MPa, and 6.0 MPa·m$^{0.5}$, respectively.

EXAMPLE 11

25 vol % of tungsten carbide powder and 75 vol % of chromium carbide were added to de-ionized water and blended for 24 hours to obtain a homogeneous slurry. After drying, sieving and preforming, the resultant green compact was placed in a graphite mold and was sintered at 1,550° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 96.8%, 21.22 GPa, 874 MPa, and 7.0 MPa·m$^{0.5}$, respectively.

EXAMPLE 12

25 vol % of tungsten carbide powder and 75 vol % of chromium carbide were added to de-ionized water and blended for 24 hours to obtain a homogeneous slurry. After drying, sieving and preforming, the resultant green compact was placed in a graphite mold and was sintered at 1,600° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 97.5%, 22.66 GPa, 859 MPa, and 7.2 MPa·m$^{0.5}$, respectively.

EXAMPLE 13

25 vol % of tungsten carbide powder and 75 vol % of chromium carbide were added to de-ionized water and blended for 24 hours to obtain a homogeneous slurry. After drying, sieving and preforming, the resultant green compact was placed in a graphite mold and was sintered at 1,700° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 99.0%, 23.15 GPa, 809 MPa, and 6.8 MPa·m$^{0.5}$, respectively.

EXAMPLE 14

20 vol % of tungsten carbide powder and 80 vol % of chromium carbide were added to de-ionized water and blended for 24 hours to obtain a homogeneous slurry. After drying, sieving and preforming, the resultant green compact was placed in a graphite mold and was sintered at 1,700° C. under a pressure of 30 MPa and a vacuum atmosphere for 1 hour. The sintered product was cut into 3×4×36 mm specimens. The measured relative density, hardness, and flexural strength (fracture toughness was not measured), which are also summarized in Table 1, are 99.2%, 21.79 GPa, and 841 MPa, respectively.

COMPARATIVE EXAMPLE 1

Pure Chromium carbide was added to de-ionized water and blended for 24 hours to obtain a homogeneous slurry. After drying, sieving and preforming, the resultant green compact was placed in a graphite mold and was sintered at 1,500° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 99.7%, 18.57 GPa, 574 MPa, and 4.5 MPa·m$^{0.5}$, respectively.

COMPARATIVE EXAMPLE 2

Pure Chromium carbide was added to de-ionized water and blended for 24 hours to obtain a homogeneous slurry. After drying, sieving and preforming, the resultant green compact was placed in a graphite mold and was sintered at 1,600° C. under a pressure of 30 MPa and an argon atmosphere for 1 hour. The sintered product was cut into 3×4×36 mm specimens. The measured relative density, hardness, flexural strength and fracture toughness, which are also summarized in Table 1, are 99.9%, 19.41 GPa, 526 MPa, and 4.1 MPa·m$^{0.5}$, respectively.

By comparing the results obtained from Examples 1 through 14 and Comparative Examples 1 and 2, it is apparent that the tungsten carbide reinforced chromium carbide matrix composite exhibits superior flexural strength and fracture toughness over the monolithic chromium carbide. In addition to these improved mechanical characteristics, the addition of 20 vol % tungsten carbide and sintering at 1,600° C. for one hour, as illustrated in Example 14, also reduced the thermal expansion coefficient of the composite to $9.51 \times 10^{-6}$/°C., from $11.2 \times 10^{-6}$/°C. measured from a single-composite chromium carbide. This allows the composite material of the present invention to provide long-term dimensional stability and enable it to be particularly suitable for use in making surveying tools.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

| Example No. | Tungsten Carbide (vol %) | Sintering Temperature (°C.) | Sintering Time (hr) | Relative Density (%) | Hardness (GPa) | Flexural Strength (MPa) | Fracture Toughness (MPa · m$^{0.5}$) | Sintering Atmosphere |
|---|---|---|---|---|---|---|---|---|
| 1 | 14 | 1400 | 2 | 95.6 | 18.17 | 804 | 5.2 | Argon |
| 2 | 14 | 1400 | 4 | 96.5 | 19.78 | 825 | 5.5 | " |
| 3 | 14 | 1500 | 1 | 98.2 | 20.46 | 816 | 6.1 | " |
| 4 | 14 | 1500 | 2 | 98.6 | 20.96 | 846 | 6.4 | " |
| 5 | 14 | 1550 | 1 | 97.9 | 20.74 | 823 | 6.3 | " |
| 6 | 14 | 1600 | 1 | 99.2 | 21.07 | 737 | 6.0 | " |
| 7 | 20 | 1500 | 1 | 98.3 | 19.81 | 796 | 6.5 | " |

TABLE 1-continued

| Example No. | Tungsten Carbide (vol %) | Sintering Temperature (°C.) | Sintering Time (hr) | Relative Density (%) | Hardness (GPa) | Flexural Strength (MPa) | Fracture Toughness (MPa · m$^{0.5}$) | Sintering Atmosphere |
|---|---|---|---|---|---|---|---|---|
| 8 | 20 | 1550 | 1 | 98.9 | 21.70 | 868 | 6.7 | " |
| 9 | 20 | 1600 | 1 | 99.1 | 21.86 | 883 | 6.8 | " |
| 10 | 25 | 1500 | 1 | 94.7 | 17.65 | 641 | 6.0 | " |
| 11 | 25 | 1550 | 1 | 96.8 | 21.22 | 874 | 7.0 | " |
| 12 | 25 | 1600 | 1 | 97.5 | 22.66 | 859 | 7.2 | " |
| 13 | 25 | 1700 | 1 | 99.0 | 23.15 | 809 | 6.8 | " |
| 14 | 20 | 1600 | 1 | 99.2 | 21.79 | 841 | — | vacuum |
| Comp. 1 | 0 | 1500 | 1 | 99.7 | 18.57 | 574 | 4.5 | Argon |
| Comp. 2 | 0 | 1500 | 1 | 99.9 | 19.41 | 526 | 4.1 | " |

What is claimed is:

1. A ceramic composite comprising:
   (a) 65 to 95 percent by volume of chromium carbide; and
   (b) 5 to 35 percent by volume of tungsten carbide;
   (c) wherein said composite is prepared from a sintering process without using a metallic sintering aid, and said composite has a hardness of at least 17.65 GPa, a flexural strength of at least 641 MPa, and a fracture toughness of at least 5.2 MPa•m$^{0.5}$.

2. The ceramic composite according to claim 1 wherein said chromium carbide exists as a continuous phase and said tungsten carbide exists as a discontinuous phase.

3. The ceramic composite according to claim 1 wherein said ceramic composite comprises 75 to 90 percent by volume of chromium carbide and 10 to 25 percent by volume of tungsten carbide.

4. The ceramic composite according to claim 1 wherein said ceramic composite is prepared from chromium carbide particles with diameters ranging from 0.1 to 10.0 μm.

5. The ceramic composite according to claim 1 wherein said ceramic composite is prepared from tungsten carbide particles with diameters ranging from 0.1 to 15.0 μm.

6. The ceramic composite according to claim 1 wherein said ceramic composite is prepared by sintering a green compact made from a mixture of said chromium carbide powder and said tungsten carbide powder at a temperature between 1,400° and 1,800° C. and a sintering pressure between 5 and 50 MPa.

7. The ceramic composite according to claim 6 wherein said ceramic composite is prepared by sintering said green compact under an inert or a reducing environment.

8. A ceramic composite consisting of:
   (a) 65 to 95 percent by volume of chromium carbide; and
   (b) 5 to 35 percent by volume of tungsten carbide;
   (c) wherein said ceramic composite has a hardness of at least 17.65 GPa, a flexural strength of at least 641 MPa, and a fracture toughness of at least 5.2 MPa•m$^{0.5}$.

9. The ceramic composite according to claim 8 wherein said chromium carbide exists as a continuous phase and said tungsten carbide exists as a discontinuous phase.

10. The ceramic composite according to claim 8 wherein said ceramic composite consists essentially of 75 to 90 percent by volume of chromium carbide and 10 to 25 percent by volume of tungsten carbide.

11. The ceramic composite according to claim 8 wherein said ceramic composite is prepared from chromium carbide particles with diameters ranging from 0.1 to 10.0 μm.

12. The ceramic composite according to claim 8 wherein said ceramic composite is prepared from tungsten carbide particles with diameters ranging from 0.1 to 15.0 μm.

* * * * *